United States Patent

Helms et al.

[15] 3,700,855

[45] Oct. 24, 1972

[54] MAGNETIC DISC ASSEMBLY

[72] Inventors: Clifford J. Helms, Woodland Hills; Norman McMillan, Santa Monica; Stelios B. Papadopoulos, Westlake Village, all of Calif.

[73] Assignee: Sperry Rand Corporation, New, N.Y.

[22] Filed: Dec. 21, 1970

[21] Appl. No.: 100,242

[52] U.S. Cl. ....................219/388, 165/64, 219/365, 219/210

[51] Int. Cl. ....................F27b 9/06

[58] Field of Search......219/210, 388, 399, 400, 530, 219/540, 364, 365, 373, 378

[56] References Cited

UNITED STATES PATENTS

| | | | |
|---|---|---|---|
| 2,721,729 | 10/1955 | Van Riper | 165/64 |
| 2,893,055 | 7/1959 | Wenzel | 165/64 X |
| 2,912,556 | 11/1959 | Hold | 165/64 X |
| 3,525,452 | 8/1970 | Hofmann | 219/210 X |

FOREIGN PATENTS OR APPLICATIONS

| | | | |
|---|---|---|---|
| 910,109 | 11/1962 | Great Britain | 219/365 |
| 1,017,665 | 1/1966 | Great Britain | 365/ |

*Primary Examiner*—Volodymyr Y. Mayewsky
*Attorney*—Charles C. English, Sheldon Kapustin and William E. Cleaver

[57] ABSTRACT

A magnetic disc assembly including a system for efficiently maintaining the temperature in the disc compartment at a prescribed operating level. Disc compartment temperature is maintained at a prescribed level elevated above ambient by the combined effect of moving ambient air around a cylindrical convoluted shroud surrounding the disc compartment for cooling and by selectively activating elements within the compartment for heating. The shroud is surrounded by a concentric cylindrical cover and the ambient air flows between the shroud and the cover. The heater elements serve to quickly bring the disc compartment temperature up to the elevated operating level and to add heat as required to maintain that level. The heater elements are incorporated in the compartment within the shroud convolutions and are activated in response to a temperature sensor within the compartment. An ambient air temperature sensor controls the ambient air flow. A disc stack assembly supported in the disc compartment includes a plurality of discs mounted on a common shaft secured to a rotatable hub. In operation, the discs spin very rapidly causing the air within the compartment to move in the same direction as the disc surfaces. A flared baffle mounted within the compartment interrupts the moving air and creates a pressure differential between the upstream and downstream sides of the baffle. This pressure differential is employed to circulate the air within the compartment through a filter.

8 Claims, 6 Drawing Figures

INVENTORS
STELIOS B. PAPADOPOULOS
CLIFFORD J. HELMS
NORMAN McMILLAN
BY Lindenberg, Freilich & Wasserman
ATTORNEYS INVENTORS
STELIOS B. PAPADOPOULOS
CLIFFORD J. HELMS
NORMAN McMILLAN
BY
Lindenberg, Freilich & Wasserman
ATTORNEYS INVENTORS
STELIOS B. PAPADOPOULOS
CLIFFORD J. HELMS
NORMAN McMILLAN
BY Lindenberg, Freilich & Wasserman
ATTORNEYS

MAGNETIC DISC ASSEMBLY

BACKGROUND OF THE INVENTION

1. Field of the Invention

This invention relates generally to magnetic disc storage systems and, more particularly, to a magnetic disc assembly including a system for efficiently maintaining the temperature in a disc compartment at a prescribed operating level.

2. Description of the Prior Art

Magnetic disc assemblies are widely employed in data processing systems for mass storage. Such assemblies usually consist of a plurality of rotatable discs, each having a pair of magnetic surfaces. Some such systems use a fixed head arrangement wherein a plurality of heads are provided for each disc surface, each head being dedicated to a different disc track. Other systems use a movable head arrangement wherein a small number of heads, e.g., four, are carried by an arm adjacent each disc surface with the arm being mounted for linear movement along a disc radius to thus enable a head to be moved into position adjacent any selected one of a plurality of tracks. In order for a disc to yield maximum storage capacity, the tracks on the disc surface must be spaced very closely, e.g., 150 tracks per inch, requiring, of course, that a very precise linear positioner be provided for positioning the heads. In addition to a precise linear positioner, however, it is essential that the operating temperature in the disc compartment be maintained substantially constant to minimize disc dimension variations. That is, if the operating temperature in the disc compartment were permitted to vary significantly, the disc dimensions would also exhibit a significant variation, and thus cause an error in positioning accuracy. If this occurs, it would not be possible to accurately position a head for reading a track at one temperature which was written at a different temperature regardless of the precision of the linear positioner. Unless precautions are taken, temperature variations are likely to occur within the disc compartment as a consequence of the heat produced by the friction between the spinning disc surfaces and the air within the disc compartment.

In order to maintain disc compartment temperature constant, most prior art disc assemblies utilize a fairly elaborate and expensive air conditioning system to remove heat.

SUMMARY OF THE INVENTION

In accordance with the present invention, a system is provided for maintaining the temperature in a disc compartment at a certain operating level by permitting the compartment temperature to rise to an elevated level whereat it is maintained by the combined effect of ambient air flow and heater element actuation.

In the preferred embodiment of the invention, the disc compartment is enclosed by a cylindrical shroud formed of aluminum convoluted to yield a surface length greater than its axial length to optimize heat transfer to ambient air flowing therepast. The shroud is surrounded by a cylindrical cover and the ambient air flows between the shroud and the cover. The amount of air flow is preferably controlled in response to ambient air temperature.

In accordance with a significant aspect of the present invention, heater elements are mounted in the disc compartment within the shroud convolutions. The heater elements serve both to accelerate the rise of the compartment temperature to the elevated operating level and to maintain the temperature at that level. The duration of actuation of the heater element is preferably controlled in response to compartment air temperature.

In accordance with an important feature of the preferred embodiment of the invention, a flared baffle is provided within the disc compartment to create a pressure differential for circulating the air within the compartment through a filter.

The novel features of the invention are set forth with particularity in the appended claims. The invention will be best understood from the following description when read in conjunction with the accompanying drawing.

DESCRIPTION OF THE PREFERRED EMBODIMENTS

Figure 1:
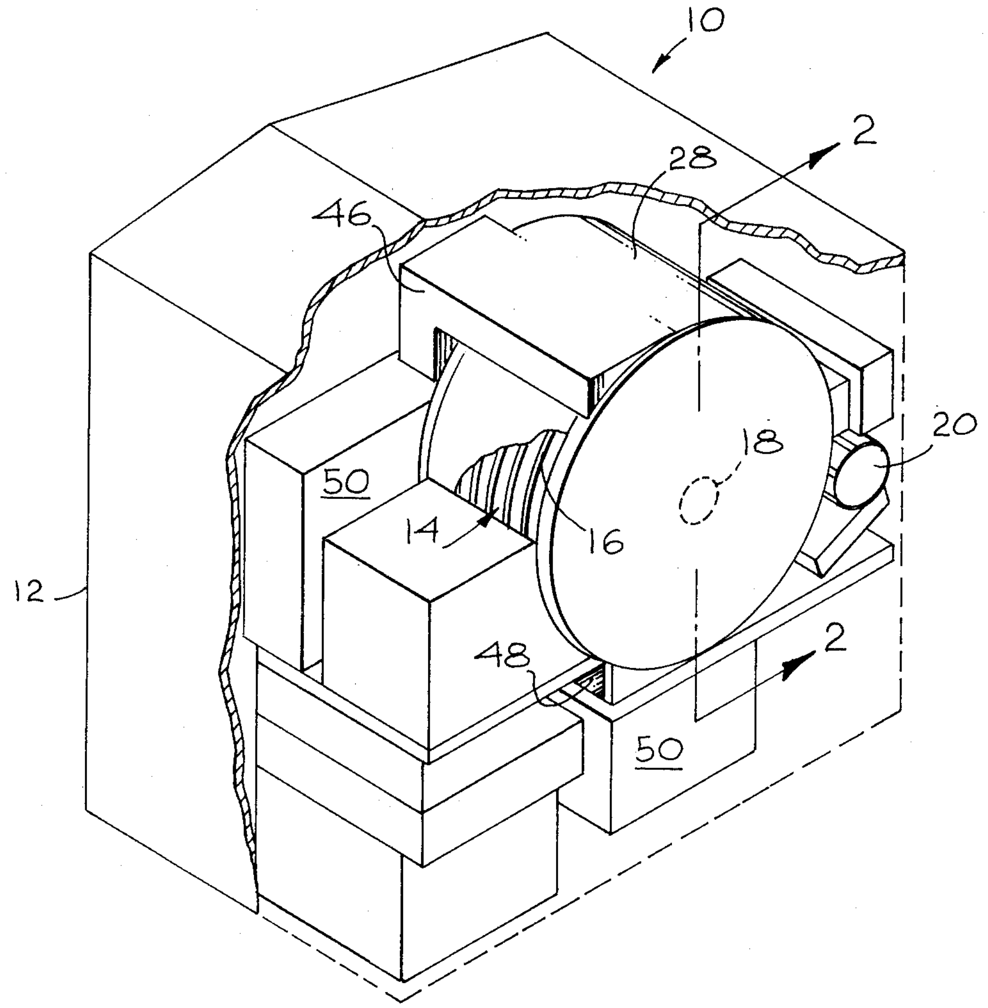
FIG. 1 is a perspective view of a magnetic disc assembly in accordance with the present invention.

Attention is now called to FIG. 1 which illustrates a magnetic disc assembly embodying the teachings of the present invention. As has been pointed out, magnetic disc assemblies are widely employed in data processing systems for mass storage. Such assemblies usually consist of a plurality of rotatable discs each having a pair of magnetic surfaces upon which information can be recorded. Many magnetic disc assemblies employ a movable head arrangement for reading and writing information. In such assemblies, a relatively small number of heads are supported on an arm adjacent each disc surface with the arm being mounted for linear movement along a disc radius. In this manner, a head can be moved into any selected one of a plurality of positions along the disc radius to record concentric tracks of information on the disc surface. The resolution with which the heads can be repeatably positioned determines the track density which, of course, constitutes a significant factor in the determination of the disc storage capacity. In order to achieve the greatest storage per dollar, it is of course desirable to space the tracks as closely as possible and densities as high as 150 tracks per inch have been realized. In order to achieve such a fine positioning resolution, it is of course essential to have an extremely precise linear positioner. In addition, however, it is essential to assure dimensional stability so that a head can be repeatably positioned over the same disc track within very small tolerances.

For example, if the disc dimensions were permitted to vary significantly in response to temperature variations, it would be extremely difficult to read information at one temperature which was recorded at another temperature. That is, even though the linear positioner might be bringing the head to rest at precisely the same position at different temperatures relative to the positioner mounting, if the disc dimensions varied, then the track position relative to the positioner mounting would also vary.

In order to avoid dimensional instability, it is important to maintain the temperature within a disc compartment within very close limits.

The assembly 10 of FIG. 1 is comprised of a housing 12 enclosing both mechanical and electronic subassemblies. The mechanical subassembly is essentially comprised of a stack of discs 14 including a plurality of individual discs 16 all perpendicularly mounted on a central shaft 18. The shaft 18 is mounted for rotation about its longitudinal axis and is rotatably driven, as by a belt train (not shown), by a drive motor 20.

Figure 2:
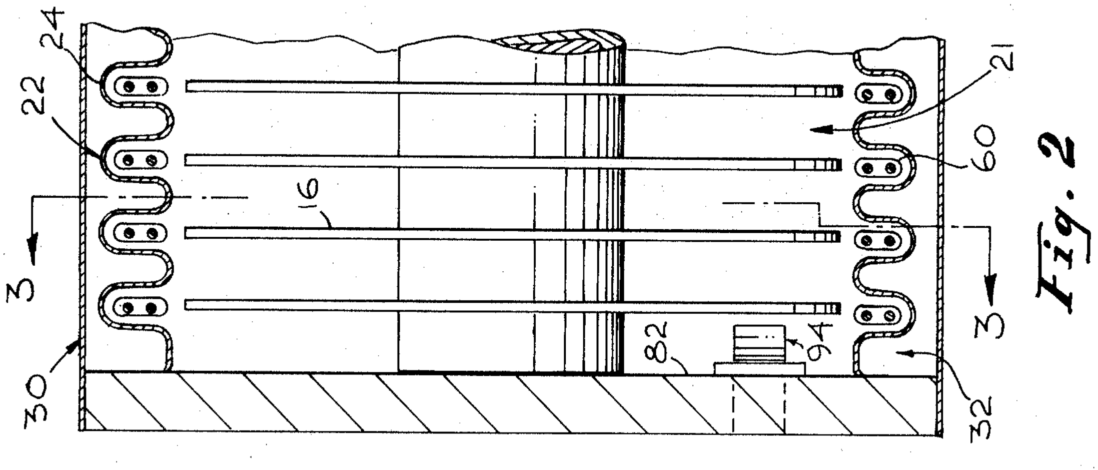
FIG. 2 is a vertical sectional view taken substantially along the plane 2—2 of FIG. 1.
Figures 3, 3A:
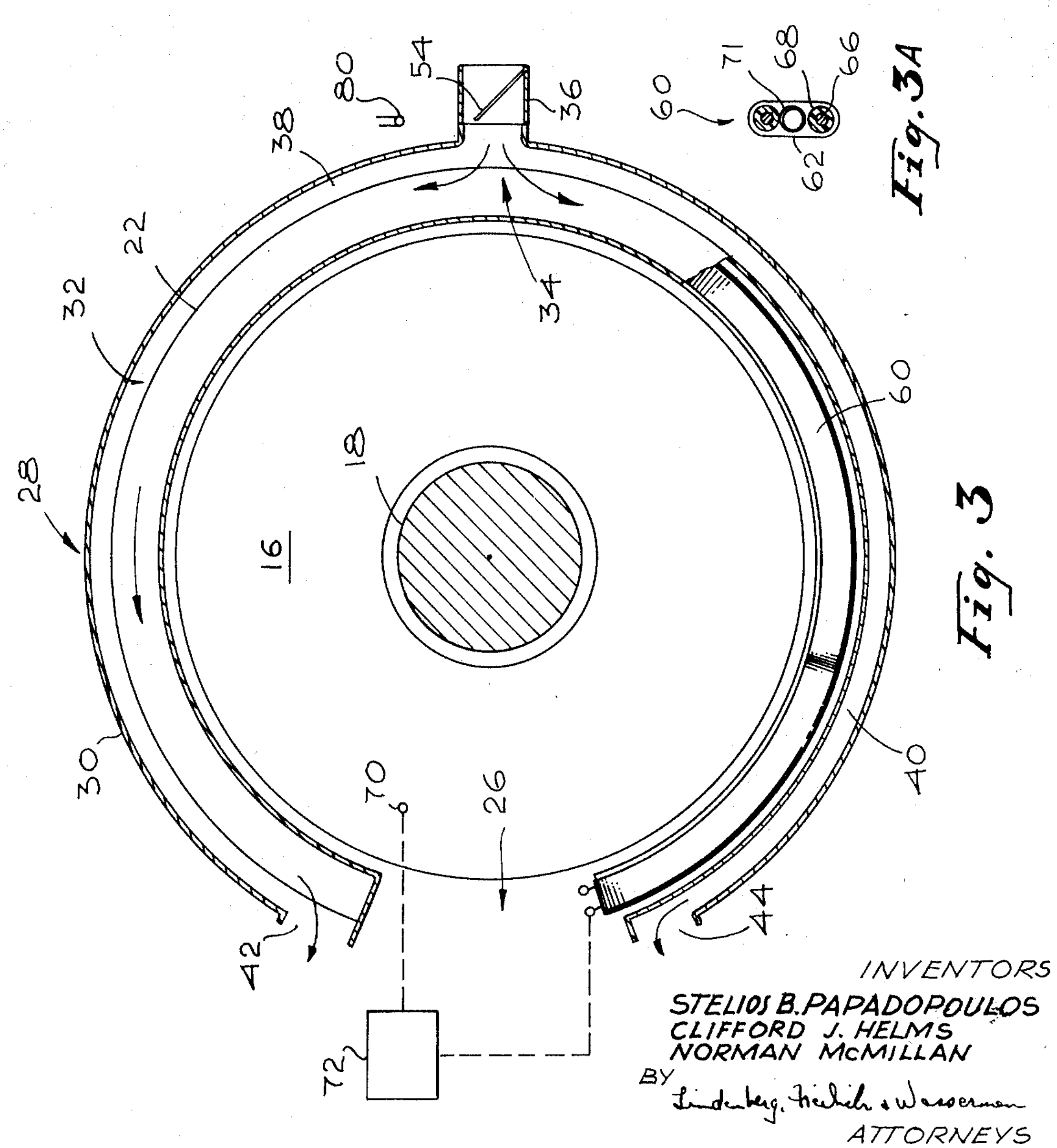
FIG. 3 is a vertical sectional view taken substantially along the plane 3—3 of FIG. 2, illustrating ambient air flow around the convoluted shroud.
FIG. 3A is an enlarged sectional view through the heater element of FIG. 3.

As is shown in FIGS. 1—3, the disc stack 14 is supported within a disc compartment 21 defined within a substantially cylindrical shroud 22. The shroud 22 is formed of a wall of substantially uniform thickness and of a material having good heat conductivity characteristics, e.g. aluminum. The shroud wall 24 is convoluted along the length thereof as is best illustrated in FIG. 2. The convolutions are provided in order to increase the wall surface area exposed to the disc compartment 21 in order to maximize heat transfer from the disc compartment to the wall. As is best shown in FIG. 3, the shroud comprises a substantially enclosed cylinder open only in the area 26 for enabling the head carrying arms to project into the disc compartment 21.

A substantially cylindrical cover 28 is mounted around the shroud 22. The inner surface of the cover wall 30 is spaced from the outer surface of the shroud wall 24 to define a passageway 32 therebetween. The cover 28 opens in the region 34 shown in FIG. 3 into an air supply conduit 36. Air supplied to the conduit 36 can be drawn through an upper portion 38 of the passageway 32 or a lower passageway portion 40. Air drawn through the upper passageway portion 38 is exhausted at port 42 defined in the cover while air drawn through passageway portion 40 is exhausted through port 44. Ports 42 and 44 are respectively coupled to air conduits 46 and 48 (FIG. 1) leading to the electronic subassemblies contained within blocks 50 shown in FIG. 1. For reasons which will be discussed hereinafter, a movable flap 5 4 is mounted within the air conduit 36 to selectively permit air flowing through the conduit 36 to be directed to both upper and lower passageway portions 38 and 40 or to passageway portions 38 only.

For reasons also to be discussed hereinafter, arcuately shaped heater elements 60 are mounted within at least some of the convolutions in shroud 22 as is best shown in FIGS. 2 and 3. As shown in FIG. 3A, the heater elements are preferably comprised of a housing 62 formed of aluminum tubing bent into an arcuate shape to conform to the radius of curvature of the shroud. A continuous length of heater element wire 66 is mounted in the shroud and electrically insulated from the aluminum tubing by insulative tubing 68. Insulative tubing 71 positions the heater element wire within the heater element housings 62.

As previously pointed out, for proper operation of the disc assembly, it is essential that the discs be dimensionally stable and accordingly, it is necessary that the temperature within the disc compartment 21 be maintained at a substantially constant level. This operating temperature level must be maintained despite the fact that an enormous amount of heat is generated during operation as a consequence of the friction between the rapidly rotating disc surfaces and the air within the disc compartment. In a typical embodiment of the invention, 11 24 inch diameter discs are mounted within the disc compartment and are rotated at 1,800 rpm. The friction generated between the disc surfaces and the disc compartment air acts as a 1,000 watt heater. Whereas most prior art disc assemblies incorporate an elaborate and expensive air conditioning system to rapidly remove this heat generated within the disc compartment, in accordance with the present invention an operating temperature level within the disc compartment is selected which is elevated from ambient. More particularly, for a typical disc assembly intended to operate over an ambient temperature range of 60° F. to 90° F., an operating temperature level within the disc compartment of 116° F. ± 1° may be selected.

It has been mentioned that ambient air is supplied through the air conduit 36 to either the upper passageway portion 38 or both the upper and lower passageway portions 38 and 40. In the typical embodiment of the system mentioned, when the ambient air is directed to both the upper and lower passageways, it will be assumed to be flowing through the conduit 36 at 300 cubic feet per minute (CFM). When the ambient air is supplied only through the upper passageway portion, it will be assumed to flow at 150 CFM. Based on these assumptions, the 1,000 watts generated within the disc compartment as a consequence of friction, may, for example, produce a 20° F. rise therein above the temperature of the ambient air. Thus, if the ambient air is at the low end of the ambient operating range, i.e., 60° F., it is necessary to supply a great deal of additional heat to the disc compartment while if the ambient air is at the high end of the range, i.e., 90° F., then the heat required to be supplied to the disc compartment by the heater elements 60 will not be nearly as great. Actuation of the heater elements 60 is controlled by a temperature sensor 70 mounted within the disc compartment. Whenever the disc compartment temperature falls below the operating level of 116°, this fact is communicated to the control means 72 to energize the heater element 60. In order to prevent hunting, the heater elements are energized for limited duration intervals.

The heater elements 60 are not only useful to maintain the disc compartment temperature at the elevated operating level but in addition are important to enable the disc compartment temperature to rapidly reach that level when the assembly is first turned on. That is, utilization of the heater elements 60 in accordance with the invention can reduce the time required to stabilize the disc compartment temperature at the elevated operating level to less than 30 minutes, for example. The flap 54 within the air conduit 36 is provided to reduce the requirements on the heater element 60. That is, if the ambient temperature is very low, e.g. less than 75° F., then it is desirable to reduce the amount of heat carried away by the ambient air flow through the passageway 32 between the shroud 22 and cover 30. A temperature sensor 80 responsive to the ambient air temperature controls the position of the flap 54 so that whenever the ambient air temperature is below 75° F., air flow is restricted to the upper passageway portion 38.

Figure 5:
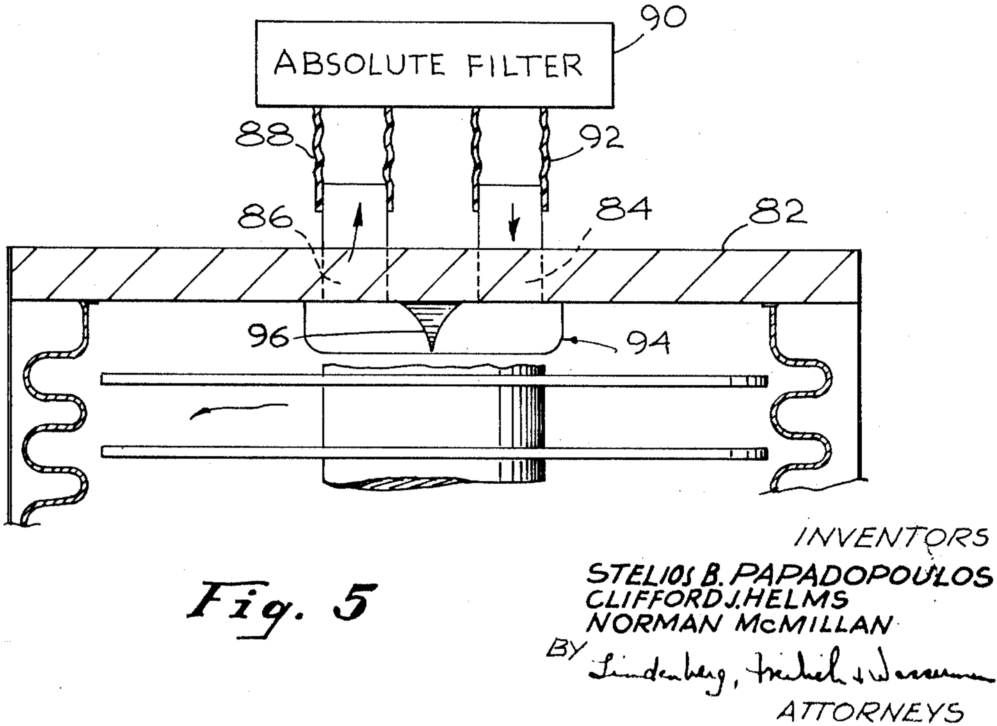
FIG. 5 is a top view of the end plate illustrated in FIG. 4.

It should be recognized that the flow of ambient air, thus far discussed, through the passageway 32 does not enter the disc compartment but rather only carries heat away from the shroud 22 which acts as a heat sink for the disc compartment 21. It is desirable to keep the disc compartment 21 substantially enclosed in order to prevent dust or any other foreign objects from falling onto the disc surfaces. Nevertheless, despite the fact that the disc compartment is enclosed, it is still desirable to filter the air within the disc compartment to remove any particles which may, one way or another, enter the compartment. In order to do this, the disc compartment end plate 82, as shown in FIG. 5, is provided with a pair of openings 84 and 86. Opening 86 communicates with an air conduit 88 leading to an absolute filter 90. An air conduit 92 couples the output of the absolute filter to the opening 84 in the end plate 82. A flared baffle 94 is mounted against the end plate. The flared baffle 94 consists of a baffle member 96 whose width decreases smoothly as measured at increasing displacements from the end plate 82.

Figure 4:
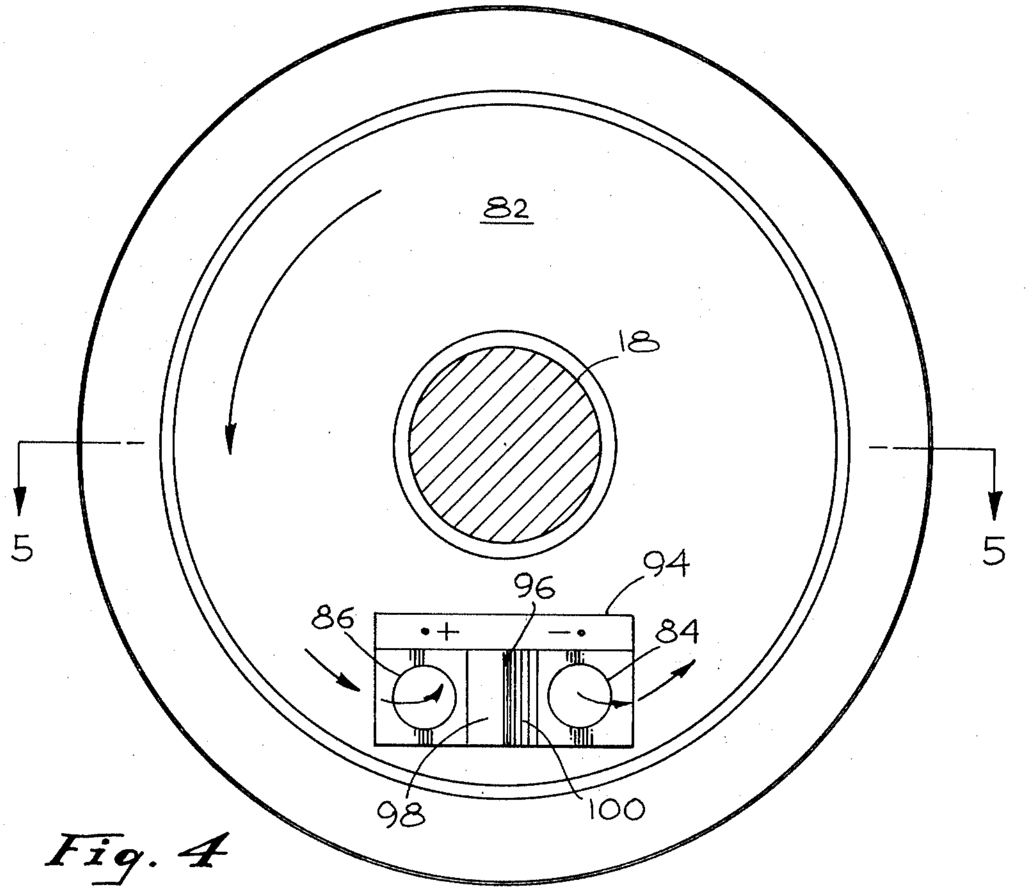
FIG. 4 is a sectional view illustrating the disc compartment and plate carrying the flared baffle.

In operation, and as depicted in FIGS. 4 and 5, as the discs rotate, they carry the disc compartment air along in the same direction as the disc surface movement. The baffle member 96 creates turbulence in the air movement which produces a positive differential pressure at the upstream side 98 of the baffle member as compared to the pressure at the downstream side 100. This differential pressure between the sides 98 and 100 of the baffle member 96 forces air through the end plate opening 86 and conduit 88 into the absolute filter 90 from which it is returned through the end plate opening 84 to the disc compartment. In this manner, the disc compartment air is filtered without requiring the use of any active filter motors but by instead relying on the disc motion itself to create the air movement for filtering.

From the foregoing, it should be recognized that an improved magnetic disc assembly has been disclosed herein in which dimensional stability is achieved by maintaining disc compartment temperature at a constant operating level elevated from ambient. The disc compartment temperature is maintained constant as a consequence of the joint effects of ambient air flow and heater element actuation. In addition, disc compartment air is filtered as a consequence of the disc motion which produces air movement through a filter.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. A magnetic disc storage assembly including:

a shaft mounted for rotation about the longitudinal axis thereof;

a plurality of discs mounted on said shaft and extending perpendicular to the longitudinal axis thereof;

a substantially cylindrical shroud fixedly mounted around said discs to define a substantially enclosed disc compartment;

a cover surrounding said shroud and spaced therefrom so as to provide a passageway between the shroud and the cover;

means including an air intake conduit for drawing ambient air through said passageway and over the outer surface of said shroud to thereby remove the heat from said compartment;

electrically actuatable heater means disposed in said compartment;

first temperature sensing means in said compartment for indicating when the temperature therein is below a prescribed operating level;

means responsive to said temperature sensing means indicating the compartment temperature is below said operating level for energizing said heater means;

second temperature sensing means for detecting the temperature of the ambient air, and air control means responsive to the second temperature sensing means to vary the flow of ambient air over the shroud whereby the cooling effect of said ambient air flow over said shroud and the heat produced by said heater means operates to stabilize the temperature in said compartment.

2. The storage assembly of claim 1 wherein said ambient air is drawn into said passageway at a first position on the circumference of said shroud and wherein said passageway extends from said first position through upper and lower semicylindrical passageway portions; and exhaust openings formed in said upper and lower passageway portions at positions substantially diametrically displaced from said first position.

3. The storage assembly of claim 2 including a plurality of electronic circuit modules; and conduit means coupled between at least one of said exhaust openings and said electronic circuit modules for exhausting air from said passageway adjacent to said circuit modules for cooling.

4. The storage assembly of claim 1 wherein said shroud is comprised of a wall formed of good heat conductive material and having a plurality of convolutions formed therein.

5. The storage assembly of claim 4 wherein each of said convolutions extends around the circumference of said cylindrical shroud; and wherein said heater means is comprised of at least one arcuate heater element supported in one of said convolutions.

6. The storage assembly of claim 1 including:

a plate fixedly mounted in said disc compartment and extending perpendicular to said shaft longitudinal axis;

a fixed baffle member projecting perpendicularly from said plate t toward the surface of one of said discs;

a first conduit having an opening supported adjacent a first side of said baffle member;

a second conduit having an opening supported adjacent a second side of said baffle member; and filter means coupling said first and second conduits.

7. In a magnetic disc storage assembly which includes:

a shaft mounted for rotation about the longitudinal axis thereof;

at least one disc mounted on said shaft and extending perpendicular to the longitudinal axis thereof;

a substantially cylindrical shroud fixedly mounted around said disc to define a substantially enclosed disc compartment; and a plate fixedly mounted in said disc compartment and extending perpendicular to said shaft longitudinal axis; the improvement which comprises;

a fixed baffle member projecting perpendicularly from said plate toward the surface of said disc;

a first conduit having an opening supported adjacent a first side of said baffle member;

a second conduit having an opening supported adjacent a second side of said baffle member; and filter means coupling said first and second conduits.

8. The improvement of claim 7 wherein said baffle member is flared and has a width which decreases smoothly measured at increasing displacements from said plate.

* * * * *